3,133,941
COMPLEX POLYAMIDE ADDUCTS
Gayle D. Edwards and Howard V. Moore, Austin, Tex., assignors to Jefferson Chemical Company, Inc., Houston, Tex., a corporation of Delaware
No Drawing. Filed Feb. 26, 1959, Ser. No. 795,600
8 Claims. (Cl. 260—404.5)

The instant invention relates to complex polyamide adduct products and to their method of preparation. In addition, the invention also relates to corrosion inhibited compositions containing the novel adduct products and a method of inhibiting corrosion therewith. In particular, it relates to the adducts resulting from the reaction of organic acids, high-boiling amine residues and a member selected from the group consisting of alkylene oxide, aralkylene oxide, alkylene carbonate and aralkylene carbonate, said member having from 2 to 12 carbon atoms.

Amine type compounds have been employed heretofore as corrosion inhibitors to inhibit the corrosion of ferrous metals brought in contact with the various corrosive fluids. In particular, such compounds have been employed to protect the production, transfer and storage equipment employed in the petroleum industry. The use of such materials has been limited however, due to their cost and to the high levels of amines required to provide adequate protection. It has now been discovered that certain novel amine residue-organic acid-alkylene (aralkylene) oxide adducts and amine residue-organic acid-alkylene (aralkylene) carbonate adducts are very effective corrosion inhibitors. These materials are relatively inexpensive and exhibit the ability to maintain good corrosion inhibiting protection at low levels of concentration. These novel adducts also have surface active properties and are therefore useful in detergent preparations.

In accordance with this invention a high-boiling amine residue, the preparation of which is described below, is reacted with a carboxylic acid at an elevated reaction temperature and at an amine to acid equivalent ratio in the range of 0.5:1 to 5:1. The resultant amide condensate is reacted with an alkylene oxide or an alkylene carbonate at a temperature between about 50 and 200° C., a pressure between about 0 and 100 p.s.i.g. (pounds per square inch gauge) and a weight ratio of condensate:oxide or carbonate in the range of from 20:1 to 1:1.

AMINE RESIDUE REACTANT

The amine residues employed are high-boiling components of a complex amine reaction product obtained from reacting a compound selected from the group consisting of monoethanolamine, ethylenediamine and ethylene glycol with ammonia. The desired high-boiling amine residues are obtained by removing certain fractions of the complex reaction product. Ethanolamine, ethylenediamine and ethylene glycol are commonly derived from ethylene and may be represented by the formula

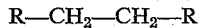

in which R represents the same or different radicals selected from the group consisting of hydroxyl and amino radicals.

Production of the complex amine reaction product from which the high-boiling amine components are obtained is accomplished by reacting monoethanolamine, ethylenediamine, or ethylene glycol with ammonia at an elevated temperature and a superatmospheric pressure in the presence of hydrogen and a hydrogenation catalyst. This reaction may be conducted at a temperature from about 150° to 400° C., but is preferably conducted in the range of 200 to 275° C. The pressure employed may range from about 30 up to about 400 atmospheres.

While the molar ratio of ammonia to ethanolamine, ethylenediamine or ethylene glycol for this reaction may be in the range of 1:1 to 5:1, the molar amount of ammonia employed should be in excess over the molar amount of the companion reactant. Normally, it will be in the order of about 2 to 3 mols of ammonia per mol of monoethanolamine and ethylenediamine and about 3 to 5 mols of ammonia per mol of ethylene glycol.

Hydrogen is essential for this reaction and should amount to a substantial part of the reaction atmosphere. As a rule, there should be at least 10 and preferably between 20 and 200 atmospheres of hydrogen pressure employed.

The reaction is conducted in the presence of a hydrogenation catalyst. While a large number of hydrogenation catalysts may be employed, the preferred catalyst comprises one or more of the materials selected from the group consisting of the metals and oxides of copper, nickel and cobalt and chromium oxide. Despite the suitability of the oxides, however, it is preferred practice to employ the catalyst in a reduced form. The preferred catalyst may also be employed with a normally non-reducible metal oxide from the group consisting of manganese oxide, molybdenum oxide, thorium oxide and an oxide of the rare earth metals. A specific preferred catalyst composition in unreduced form consists of 75% nickel oxide, 22% copper oxide and 3% chromium oxide.

The crude complex reaction product obtained from the above reaction is subjected to distillation at a temperature up to about 150° C. under 50 mm. of mercury pressure absolute, or alternatively at a temperature up to about 200° C. under atmospheric pressure. This step effectively removes certain low-boiling materials leaving a high-boiling amine composition as an amine residue, which may amount to upwards of 50% by weight of the crude complex reaction product. The low-boiling materials removed by distillation are not employed in preparing the condensation products of the instant invention. One of the main constituents of the removed low-boiling fraction is piperazine (B.P. 145° C. at 1 atm. pressure).

The high-boiling amine composition obtained according to the foregoing method is generally a dark to black-water-soluble material. It has a total amine content determined by HCl titration and stated in meq./g. (milliequivalents/gram) ranging from about 8 to 20. The hydroxyl content in meq./g. ranges from about 5.0 to about 7.0 and the molecular weight (Rast) ranging from 115 to 145.

In one preparation, 1242 grams of ethylene glycol and 1700 grams of ammonia were reacted in an aqueous slurry containing 200 grams of a pre-reduced copper-nickel-chromium oxide catalyst (30 atom percent Ni, 64 atom percent Cu and 6 atom percent Cr). The reaction was conducted in the presence of hydrogen at a temperature of 250-257° C. for 2 hours. The crude reaction product was distilled at temperatures up to 150° C. under 50 mm. of mercury pressure absolute to remove the low-boiling materials leaving a substantial quantity of high-boiling amine residue. This material had a total amine content by titration of about 8.3 meq./g.

In another preparation, monoethanolamine and ammonia were reacted in a heated reactor in the presence of a hydrogen atmosphere and in contact with 25 gallons of a nickel-copper-chromia catalyst supported on diatomaceous earth and formed into pellets. The monoethanolamine and ammonia, in a 1:3 mol ratio, were pumped up through the catalyst bed at a rate of 32 gallons of monoethanolamine per hour. The pressure was maintained at 3000 p.s.i.g. and the temperature at 240-256° C. The crude reaction product, freed of ammonia and hydrogen, was distilled at 50 mm. (millimeters) of mercury pressure absolute at temperatures up to 150° C. The lower boiling materials which were distilled overhead were removed leaving a high-boiling amine residue amounting to 35.6% of the reaction product.

Typical high-boiling amine residues obtained by reacting monoethanolamine with ammonia in the manner described above are black, viscous, water-soluble, oily liquids having the following overall properties:

| Description of property | Range |
| --- | --- |
| Percent nitrogen (micro Kjeldahl) | 27–31 |
| Total amine, milliequivalents/gram (meq./g.) (HCl titration) | 10–19 |
| Primary amine, meq./g. (Van Slyke) | 4–9 |
| Secondary amine, meq./g. (Sigga) | 2–4 |
| Tertiary amine, meq./g. (Sigga) | 4–6 |
| Hydroxyl No., meq./g. | 5–7 |
| Acetyl No., meq./g. | 12–19 |
| Molecular weight (Rast) | 115–140 |

A specific high boiling amine residue obtained by the monoethanolamine-ammonia reaction was a black-viscous, water soluble, oily liquid having an initial boiling point at atmospheric pressure of 202° C., a nitrogen (micro Kjeldahl) content of 29.7%, a total amine content (HCl titration) in meq./g., of 16.3, a primary amine (Van Slyke) content of 7.3 meq./g., a secondary amine content (Sigga) of 2.3 meq./g., a tertiary amine content (Sigga) of 5 meq./g., a hydroxyl number of 5.84 meq./g., an acetyl number of 17.1 meq./g. and a molecular weight (Rast) of 125. This product is designated for further purposes below as Amine Residue A.

Modified amine residues may be obtained by subjecting the high-boiling amine residue, exemplified by Amine Residue A to supplemental treatment or distillation to obtain distinct fractions of the high-boiling amine residue. Thus, Amine Residue A was subjected to distillation to remove about 13% of Amine Residue A overhead leaving a modified residue having desirable properties. This modified residue has a boiling range of from 202° C. at atmospheric pressure to 80° C. at 5 millimeters of mercury pressure absolute and is designated as Amine Residue B.

Another specific example of a modified amine residue is one obtained by subjecting Amine Residue A to flash distillation to distill about 87% of Amine Residue A overhead. This 87% portion of Amine Residue A was a clear brownish yellow liquid having a boiling range between 202 and 230° C. at atmospheric pressure and is designated as Amine Residue C.

The properties of amine residues B and C are recited below:

| Description of property | Amine residue B | Amine residue C |
| --- | --- | --- |
| Percent nitrogen (micro Kjeldahl) | 28.2 | 30.1 |
| Total amine, milliequivalents/gram (meq./g.) (HCl titration) | 15.7 | 18.2 |
| Primary amine, meq./g. (Van Slyke) | 8.5 | 8.3 |
| Secondary amine, meq./g. (Sigga) | 2.2 | 2.1 |
| Tertiary amine, meq./g. (Sigga) | 4.0 | 5.3 |
| Hydroxyl No., meq./g. | 5.0 | 6.5 |
| Acetyl No., meq./g. | 18.3 | 18.0 |
| Molecular weight (Rast) | 125 | 125 |

ORGANIC ACID REACTANT

A wide range of organic acids and mixtures thereof may be employed to condense with the above described high-boiling amine residues to form the products of this invention. These may be represented by the formula $R'(COOH)_n$ in which $n$ equals an integer from 1 to 3 and $R'$ represents an alkyl, cycloalkyl, alkylene, aryl, alkaryl, aralkyl and alkylidene radical having from 1 to 36 carbon atoms. These acids are characterized as saturated and unsaturated hydrocarbon mono-, di-, and polycarboxylic acids.

Typical acids or acid reacting substances which have been employed in condensation reactions with amine residues include whole and distilled tall oil, tall oil fatty acids, tall oil rosin acids, distilled cotton seed acids and acidulated cotton seed foots, coconut acids, distilled soy bean acids, oleic acid, stearic acid, a mixture of linoleic and oleic acid, oxidized wax, hydrogenated tallow acids, naturally occurring acids and mixtures comprising caprylic, palmitic, lauric, caproic, capric, linoleic, myristic and naphthenic acids. Other suitable acids include acetic, propionic, valeric, behenic, arachidic acids, mixed monomer, dimer and trimer acids and dicarboxylic acids, such as azelaic, sebacic, succinic, dilinoleic and isodecenyl succinic acids. The anhydrides of the acids may be employed in place of the acids themselves. In general, the higher fatty carboxylic acids having from 8–22 carbon atoms are preferred.

AMINE RESIDUE—ORGANIC ACID CONDENSATE

The ratio of amine residue reacted with acid or acid reacting materials may be varied to considerable extent. This ratio based on the equivalent weight values of the amine residue to the organic acid or acid mixture has been found satisfactory over the range of 0.5:1 to 5:1 although higher and lower ratios may be employed. Preferred ratios for the reaction are from about 1:1 to about 3:1. The equivalent weight of the amine is determined by titrating the amine with one normal hydrochloric acid to a pH of 3. The equivalent weight of acid is determined by titrating the acid with a 0.1 normal sodium hydroxide to the phenolphthalein end point.

The reaction between the amine residue and acid or acid-reacting substance is continued for a sufficient length of time to effect substantial condensation between the two initial reactants. The course of this reaction may be followed by collecting the water of condensation as it is distilled from the reaction product. Generally the reaction should be continued until at least about 50% of the theoretical amount of water of condensation has been collected overhead.

The intermediate amine-acid-condensation products may be prepared by weighing the desired quantities of reactants into a suitable reaction vessel. As the reactants are initially mixed there results a moderate rise in temperature from about 25 to 85° C. The vessel is then preferably fitted with a thermometer, stirrer and condenser before heating further. An external source of heat is applied to raise the temperature of the reactants to 120–300° C., preferably between 140 and 190° C. The reaction may be continued under these conditions anywhere from 1 to 20 hours or longer depending on the size of the charge and the course of the reaction as indicated by the volume of water collected overhead.

The following examples illustrate the preparation of the intermediate amine residue-acid condensation products. Solubility in 1:1 isopropyl alcohol and water solution refer to a clear homogeneous solution of a 1% concentration of the product.

*Example I*

200 grams of Amine Residue C and 336 grams of coconut acid were admixed as described above in a 3-neck reaction vessel. The equivalent ratio of amine to acid was 2:1. The reaction was continued at 160–180° C. for 1.2 hours during which time 23 milliliters of water was collected overhead amounting to 80% of theoretical. The product designated as Condensate A was insoluble in water, soluble in hot 36–38° API gravity mineral base oil and soluble in a solution of 1:1 isopropyl alcohol and water.

*Example II*

125 grams of Amine Residue C and 596 grams of tall oil fatty acids (oleic and linoleic acids) were admixed as described above in a 3-neck reaction vessel. The equivalent ratio of amine to acid was 1:1. The reaction was continued at 160–170° C. for 4.5 hours during which time 30 milliliters of water was collected as overhead amounting to 84% of the theoretical water. The recovered product designated as Condensate B was a brown paste which was insoluble in water, soluble in hot 36–38° API gravity mineral base oil and was soluble in 1:1 isopropyl alcohol and water.

Three more amine residue-acid condensates called Condensates C, D and E were prepared from Amine Residue C essentially in the manner described in Examples I and II above. A compilation of the reaction data in the preparation of Condensates A–E is given below in Table I. All the condensate products of Table I varied in consistency from a soft paste to a hard wax and were insoluble in water, soluble in hot 36–38° API gravity mineral base oil and soluble in 1:1 isopropyl alcohol and water.

II. One hundred grams of the condensates were used in each of the preparations. The amounts of ethylene oxide employed were varied as indicated in Table II.

TABLE II

| Adduct | Reactants | | Reaction temp., °C. | Maximum pres., p.s.i.g. | Reaction time, minutes |
|--------|-----------|--|---|---|---|
| | Amine-acid condensate, 100 g. | Ethylene oxide, grams | | | |
| A | E | 8 | 130 | 40 | 30 |
| B | E | 32 | 75–130 | 40 | 98 |
| C | B | 24 | 130–145 | 40 | 103 |
| D | D | 8 | 130 | 40 | 35 |
| E | D | 16 | 135–140 | 40 | 35 |
| F | D | 32 | 128–135 | 40 | 155 |
| G | A | 23 | 135 | 40 | 10 |
| H | A | 30 | 130–160 | 40 | 32 |
| I | A | 64 | 130–170 | 40 | 20 |

TABLE I

| Condensate | Reactants | | Amine, grams | Acid, grams | Equivalent ratio, amine:acid | Reac. time, hrs. | Reac. temp., °C. | H₂O overhead, ml. | Percent theoretical of H₂O overhead |
|---|---|---|---|---|---|---|---|---|---|
| | Amine residue | Acid | | | | | | | |
| A | C | Coconut | 200 | 336 | 2:1 | 1.2 | 160–180 | 23 | 80 |
| B | C | Tall oil fatty acids ¹ | 125 | 596 | 1:1 | 4.5 | 160–170 | 30 | 84 |
| C | C | Stearic | 300 | 432 | 3:1 | 2.8 | 150–170 | 24 | 83 |
| D | C | Lauric | 188 | 600 | 1:1 | 2.7 | 165–175 | 42 | 78 |
| E | C | Caprylic | 125 | 288 | 1:1 | 2.5 | 150–180 | 32 | 89 |

¹ Tall oil fatty acids—51% oleic acid, 46% linoleic acid, 3% saturated acids (e.g. adipic and sebacic acids).

PREPARATION OF THE NOVEL ALKYLENE OXIDE ADDUCT

The amine residue-organic acid condensate products as heretofore defined are reacted with an alkylene oxide of from 2 to 12 carbon atoms in a weight ratio of condensate:oxide of between 20:1 and 1:1, preferably between 10:1 and 10:3, at a temperature of between 100 and 200° C., preferably between 130 and 150° C., and at a pressure between 0 and 100 p.s.i.g., preferably between 20 and 40 p.s.i.g. In the preferred procedure the reaction is conducted in a closed container and the reaction mixture is continuously agitated. In addition, it is preferred to incrementally add the alkylene oxide to the condensate at a rate which prevents the autogenous pressure from rising above about 40 p.s.i.g. The reaction is normally completed within 0.1 to 10 hours.

The reaction adduct produces are dark colored and vary in consistency from a thin oil to a hard wax. They are soluble in a 1:1 mixture of isopropyl alcohol and water, petroleum ether, kerosene and carbon tetrachloride. In boiling water they are either insoluble or form dispersions.

In the definition of the term "an alkylene oxide" we include aralkylene oxide as well as alkylene oxide. Specific examples of the oxides contemplated herein are ethylene oxide, propylene oxide, 1,2 butylene oxide and styrene oxide.

Example III and Table II below further illustrate the preparation of the novel amine residue-organic acid-alkylene oxide adduct products of this invention:

Example III 100 grams of Condensate A described in Example I was added to a stainless steel rocking autoclave and heated to 135° C. The rocking autoclave was set in motion and 23 grams of liquid ethylene oxide was added to Condensate A incrementally and at a rate which limited the autogenous pressure in the autoclave to a maximum of 40 p.s.i.g. The reaction was conducted for a period of 10 minutes and the reaction product was then withdrawn from the autoclave. The adduct product designated as Adduct G was black in color and of a thin paste consistency. Further data on this product is reported in subsequent Tables II and III.

Data on the preparation of 9 specific examples of the novel alkylene oxide adduct are reported below in Table II.

A description of the properties of the adducts reported in Table II are found in Table III below:

TABLE III

| Adduct | Percent nitrogen | Solubility in oils ¹ | Solubility in boiling H₂O | Color and consistency |
|---|---|---|---|---|
| A | 9.1 | Soluble | Insoluble ² | Thin black oil. |
| B | 7.5 | ---do--- | ---do.² | Thin brown paste. |
| C | 4.4 | ---do--- | ---do.² | Thin black oil. |
| D | 7.1 | ---do--- | ---do.² | Thick brown paste. |
| E | 6.6 | ---do--- | ---do.² | Soft brown wax. |
| F | 5.8 | ---do--- | ---do.² | Brown wax. |
| G | 9.5 | ---do--- | Dispersible | Thin black paste. |
| H | 9.0 | ---do--- | ---do--- | Do. |
| I | 7.3 | ---do--- | ---do--- | Do. |

¹ Oils include petroleum ether, kerosene, carbon tetrachloride.
² Soluble to less than 1 g. in 100 ml. boiling water.

PREPARATION OF NOVEL ALKYLENE CARBONATE ADDUCT

The other group of novel adducts contemplated herein are the amine residue-organic acid-alkylene (aralkylene) carbonate adducts. These hydroxyalkyl carbamate derivatives of the high-boiling amine-organic acid condensates are prepared by combining, preferably with stirring, said condensate product with an alkylene carbonate having from 2 to 12 carbon atoms in a weight ratio of condensate:carbonate of between 20:1 and 1:1, preferably between 20:1 and 10:1, at a temperature between about 50 and 200° C., preferably between about 50 and 100° C. and at a pressure between about 0 and 100 p.s.i.g., preferably between about 0 and 10 p.s.i.g. In the preferred procedure the reaction mixture is agitated. The reaction is normally completed within 0.1 to 10 hours.

In the definition of the term "an alkylene carbonate" we include aralkylene carbonate as well as alkylene carbonate. Specific examples of the carbonates contemplated herein are ethylene carbonate, propylene carbonate, 1, 2 butylene carbonate, and styrene carbonate.

Data on the preparation and properties of three specific examples of the novel alkylene carbonate adducts are reported below in Table IV.

TABLE IV

| Adduct | Reactants | | Reac. temp., °C. | Reac. time, hrs. | Ethylene-carbonate adduct, amine content thereof, meq./g. | | Percent nitrogen content of adduct |
| --- | --- | --- | --- | --- | --- | --- | --- |
| | Amine-acid Condensate C, grams | Ethylene carbonate, g. | | | Secondary | Tertiary | |
| None | 100 | 0 | | | 1.50 | 2.12 | |
| J [1] | 100 | 5.3 | 55–98 | 3.0 | 1.35 | 2.08 | 12.1 |
| K [1] | 100 | 10.6 | 80–99 | 5.5 | 0.95 | 1.96 | 11.5 |
| L [1] | 100 | 19.4 | 85–98 | 6.5 | 1.12 | 1.77 | 10.6 |

[1] Hard yellow wax: Soluble in petroleum ether, kerosene, carbon tetrachloride and 1:1 isopropyl alcohol and water; soluble to less than 1 gram in 100 ml. boiling water.

CORROSION INHIBITION

The novel amine residue-acid-alkylene (aralkylene) oxide and amine residue-acid-alkylene (aralkylene) carbonate adduct products of this invention as previously noted were unexpectedly found to possess valuable properties as corrosion inhibitors. These adduct products were found to be particularly suitable in preventing corrosion of oil well producing equipment. Adduct product amounts as low as 5 p.p.m. (parts per million) substantially reduce the corrosive effect of sour liquid well fluids on metals, e.g. ferrous metals. Adduct inhibitor amounts between 25 and 500 p.p.m. are preferred although greater and lesser amounts of inhibitor may be employed. In a typical treating operation the inhibitor adduct is incorporated into a portion of the produced well fluids and the resultant mixture is circulated through the well producing equipment by standard methods, e.g. by introducing said mixture into the annulus between the production tubing and the outside well casing.

The corrosion tests simulating corrosion of oil well producing equipment were conducted in 4 ounce polyethylene bottles fitted with polyethylene caps. Simulated corrosion conditions were effected by preparing a treated mixture of brine and oil for the bottles. Ninety milliliters of brine solution, which was prepared from sodium chloride, calcium chloride and distilled water were added to each bottle. The brine contained 10% sodium chloride and 0.5% calcium chloride by weight. Ten milliliters of a 36–38° API gravity oil from a mineral base crude source were also added to the polyethylene bottles. This mixture was then saturated for 5 minutes with gaseous hydrogen sulfide (to simulate sour well fluids). The H$_2$S gas was introduced through a fritted glass dispersion tube of medium porosity. After saturation with H$_2$S, 1 ml. of 6% aqueous acetic acid and a clean weighed coupon were added and the system closed for testing. In those instances in which the effectiveness of an inhibitor was to be determined, the inhibitor was added to the oil-brine mixture prior to saturation with the hydrogen sulfide gas and the addition of the acetic acid and metal coupon. Where used, the inhibitor was always added to give a predetermined level of inhibitor concentration specified in p.p.m. (parts per million) of the oil-brine mixture.

The corrosiveness of the system was determined by its effect on coupons prepared from mild steel bar-stock ⅛″ thick and ½″ wide. Coupons were carefully machined from the bar-stock to a smooth finish, the final dimensions being about ⅛″ x ½″ x 2″. These were stored under oil prior to use and were thoroughly washed with 5 separate portions of petroleum ether followed by drying and weighing at the time of use.

The corrosion tests were conducted in a corrosion test oven designed to maintain a constant temperature and to rotate the test bottles containing the coupon and simulated brine solution at a constant speed. The bottles were mounted on a 2 foot diameter disk which rotated at a constant 2 revolutions per minute during the test. The temperature of the oven was set at 120±2° F. These conditions were maintained for a 69–72 hour exposure period. At the end of the test period, the coupons were removed from the bottles, thoroughly washed, dried and weighed.

The value of the various corrosion inhibitors was determined by observing the physical appearance and by comparing the weight losses of the coupons from the inhibited test solutions to the appearance and weight losses of coupons exposed to similar but uninhibited sour brine solutions. The physical appearances of some of the coupons were rated bright, smooth or pitted in the order of increasingly severe evidence of corrosion. "Bright" stands for little if any detectable attack and "Smooth" indicates a detectable but uniform attack. "Pitted" indicates a severe localized attack. The effectiveness of the products produced according to the foregoing examples is shown in Table V below. It is to be noted that the percent corrosion inhibition found in Table V was calculated by the formula percent corrosion inhibition
$$= 100 - \frac{\text{mg. wt. loss coupon in inhibited soln.}}{\text{mg. wt. loss coupon in blank soln.}} \times 100$$

TABLE V

| Inhibitor | Concentration of inhibitor, p.p.m. | Coupon weight loss, mg. | Coupon appearance | Percent corrosion inhibition |
| --- | --- | --- | --- | --- |
| None | 0 | 160 | Pitted | 0 |
| Adduct A | 50 | 3 | Bright | 98 |
| Do | 25 | 2 | Smooth | 99 |
| Adduct B | 50 | 3 | Bright | 98 |
| Do | 25 | 2 | do | 99 |
| Adduct C | 50 | 2 | do | 99 |
| Do | 25 | 2 | do | 99 |
| Adduct D | 50 | 3 | do | 98 |
| Do | 25 | 4 | do | 98 |
| Do | 15 | 2 | do | 99 |
| Adduct E | 50 | 1 | do | 99 |
| Do | 25 | 2 | do | 99 |
| Adduct F | 50 | 2 | do | 99 |
| Do | 25 | 2 | do | 99 |
| Adduct G | 25 | 5 | Smooth | 97 |
| Do | 15 | 7 | do | 96 |
| Adduct H | 25 | 21 | do | 87 |
| Do | 15 | 12 | do | 93 |
| Adduct I | 25 | 22 | do | 86 |
| Do | 15 | 40 | do | 75 |
| Adduct J | 50 | 5 | Bright | 97 |
| Do | 10 | 15 | Pitted | 91 |
| Do | 5 | 17 | do | 89 |
| Adduct K | 5 | 10 | Smooth | 94 |
| Adduct L | 50 | 9 | do | 95 |
| Do | 25 | 6 | do | 96 |
| Do | 10 | 33 | do | 79 |

In comparison, two commercially available corrosion inhibitors of the following respective chemical structures X. 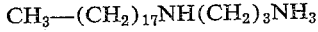

XX. 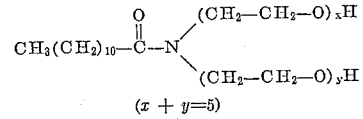

$(x + y = 5)$ were tested under the same conditions heretofore described. Commercial inhibitor X at a concentration of 50 p.p.m. allowed a test coupon weight loss of 66 milligrams which represented a corrosion reduction of only 59%. Commercial inhibitor XX at a concentration of 100 p.p.m. allowed a test coupon weight loss of 70 milligrams which represented a corrosion reduction of only 56%.

As can be seen from the preceding, the novel inhibitors of this invention are effective corrosion inhibitors particularly in sour brines and are outstandingly superior to well-known commercial inhibitors.

All percentages, parts and ratios hereinbefore and hereafter described are based on weight unless otherwise stated.

Obviously, many modifications and variations of the invention as herebefore set forth may be made without departing from the spirit and scope thereof, and therefore only such limitations should be imposed as are indicated in the appended claims.

We claim:

1. A method for preparing a polyamide adduct which comprises reacting an amine residue with an organic acid represented by the formula:

$$R'(COOH)_n$$

in which $n$ equals an integer from 1 to 3 exclusively, and $R'$ represents a $C_1$ to $C_{36}$ alkyl group in an equivalence ratio of said amine residue to said acid within the range of between about 0.5:1 and 5:1 at a temperature within the range of about 120° to about 300° C. until at least about 50% of the theoretical water of condensation has been volatilized overhead to thereby form a condensate, next reacting said condensate with a $C_2$ to $C_{12}$ member selected from the group consisting of alkylene oxide, aralkylene oxide, alkylene carbonate and aralkylene carbonate at a temperature within the range of about 50° to about 200° C. at a pressure between 0 and 100 p.s.i.g. and at a weight ratio of said condensate to said member within the range of about 1:1 to about 20:1, said amine residue being the product obtained by reacting a compound selected from the group consisting of monoethanolamine, ethylene diamine and ethylene glycol with an excess of ammonia at a temperature within the range of 150° to about 400° C. and a pressure within the range of about 30 to about 400 atmospheres, including a hydrogen partial pressure of at least 10 atmospheres, in the presence of a hydrogenation catalyst to form an amine reaction product and subjecting said reaction product to distillation up to about 150° C. under 50 mm. of mercury pressure absolute to remove the low-boiling amine products and to recover a high-boiling amine composition as said amine residue.

2. A method for preparing a polyamide adduct which comprises reacting an amine residue with a $C_8$ to $C_{22}$ aliphatic carboxylic acid in an equivalence ratio of said amine residue to said acid within the range of between about 1:1 and 3:1 at a temperature within the range of about 140° to about 190° C. until at least about 50% of the theoretical water of condensation has been volatilized overhead to thereby form a condensate, next reacting said condensate with a $C_2$ to $C_{12}$ member selected from the group consisting of alkylene oxide, aralkylene oxide, alkylene carbonate and aralkylene carbonate at a temperature within the range of about 50° to about 200° C. at a pressure between 0 and 100 p.s.i.g. and at a weight ratio of said condensate to said member within the range of about 1:1 to about 20:1, said amine residue being the product obtained by reacting a compound selected from the group consisting of monoethanolamine, ethylene diamine and ethylene glycol with an excess of ammonia at a temperature within the range of 150° to about 400° C. and a pressure within the range of about 30 to about 400 atmospheres, including a hydrogen partial pressure of at least 10 atmospheres, in the presence of a hydrogenation catalyst to form an amine reaction product and subjecting said reaction product to distillation up to about 150° C. under 50 mm. of mercury pressure absolute to remove the low-boiling amine products and to recover a high-boiling amine composition as said amine residue.

3. A method for preparing a polyamide adduct which comprises reacting an amine residue with a $C_8$ to $C_{22}$ aliphatic carboxylic acid in an equivalence ratio of said amine residue to said acid within the range of between about 1:1 and 3:1 at a temperature within the range of about 140° to about 190° C. until at least about 50% of the theoretical water of condensation has been volatilized overhead to thereby form a condensate, next reacting said condensate with a $C_2$ to $C_{12}$ alkylene oxide at a temperature within the range of about 50° to about 200° C. at pressure between 0 and 100 p.s.i.g. at a weight ratio of said condensate to said member within the range of about 10:1 to about 10:3, said amine residue being the product obtained by reacting monoethanolamine with from about 1 to 5 mols of ammonia per mol of ethanolamine at a temperature within the range of 150° to about 400° C. and a pressure within the range of about 30 to about 400 atmospheres, including a hydrogen partial pressure of at least 10 atmospheres, in the presence of a hydrogenation catalyst to form an amine reaction product and subjecting said reaction product to distillation up to about 150° C. under 50 mm. of mercury pressure absolute to remove the low-boiling amine products and to recover a high-boiling amine composition as said amine residue.

4. A method as in claim 3 wherein the fatty acid is tall oil fatty acids and the alkylene oxide is ethylene oxide.

5. A method as in claim 3 wherein the fatty acid is lauric acid and the alkylene oxide is ethylene oxide.

6. A method as in claim 3 wherein the fatty acid is caprylic acid and the alkylene oxide is ethylene oxide.

7. A method for preparing a polyamide adduct which comprises reacting an amine residue with a $C_8$ to $C_{22}$ aliphatic carboxylic acid in an equivalence ratio of said amine residue to said acid within the range of between about 1:1 and 3:1 at a temperature within the range of about 140° to about 190° C. until at least about 50% of the theoretical water of condensation has been volatilized overhead to thereby form a condensate, next reacting said condensate with a $C_2$ to $C_{12}$ alkylene carbonate at a temperature within the range of about 50° to about 200° C. at a pressure between 0 and 100 p.s.i.g. and at a weight ratio of said condensate to said member within the range of about 10:1 to about 20:1, said amine residue being the product obtained by reacting monoethanolamine with from about 1 to 5 mols of ammonia per mol of monoethanolamine at a temperature within the range of 150° to about 400° C. and a pressure within the range of about 30 to about 400 atmospheres, including a hydrogen partial pressure of at least 10 atmospheres, in the presence of a hydrogenation catalyst to form an amine reaction product and subjecting said reaction product to distillation up to about 150° C. under 50 mm. of mercury pressure absolute to remove the low-boiling amine products and to recover a high-boiling amine composition as said amine residue.

8. A method as in claim 7 wherein the fatty acid is stearic acid and the alkylene carbonate is ethylene carbonate.

References Cited in the file of this patent

UNITED STATES PATENTS

| | | |
|---|---|---|
| 2,085,706 | Schoeller et al. | June 29, 1937 |
| 2,103,872 | Schoeller et al. | Dec. 28, 1937 |
| 2,382,612 | De Groote et al. | Aug. 14, 1945 |
| 2,598,213 | Blair | May 27, 1952 |
| 2,668,165 | Carpenter | Feb. 2, 1954 |
| 2,675,355 | Lytle | Apr. 13, 1954 |
| 2,710,856 | Carpenter | June 14, 1955 |
| 2,854,323 | Shen et al. | Sept. 30, 1958 |
| 2,854,324 | Shen et al. | Sept. 30, 1958 |
| 2,861,995 | MacKenzie | Nov. 25, 1958 |
| 2,883,277 | Beiswanger et al. | Apr. 21, 1959 |